（12) United States Patent
Cymbal et al.

(10) Patent No.: US 7,703,804 B2
(45) Date of Patent: Apr. 27, 2010

(54) TELESCOPICALLY ADJUSTABLE STEERING COLUMN ASSEMBLY INCLUDING AN ADJUSTMENT STOP HAVING MINIMAL EFFECT ON IMPACT LOADS

(75) Inventors: William D. Cymbal, Freeland, MI (US); Kevin D. Gerzseny, Mt. Morris, MI (US); Michael D. Douponce, Bay City, MI (US); Stephen J. Reider, Frankenmuth, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/204,906

(22) Filed: Sep. 5, 2008

(65) Prior Publication Data

US 2009/0167009 A1 Jul. 2, 2009

Related U.S. Application Data

(60) Provisional application No. 61/016,875, filed on Dec. 27, 2007.

(51) Int. Cl.
B62D 1/18 (2006.01)

(52) U.S. Cl. .................................................. 280/775

(58) Field of Classification Search ................ 280/775, 280/777; 74/493
See application file for complete search history.

(56) References Cited

U.S. PATENT DOCUMENTS

| | | | | |
|---|---|---|---|---|
| 4,901,592 A | * | 2/1990 | Ito et al. ...................... 74/492 |
| 5,593,183 A | * | 1/1997 | Fouquet et al. ............... 280/775 |
| 5,595,399 A | * | 1/1997 | Fouquet et al. ............... 280/777 |
| 5,609,364 A | * | 3/1997 | Fouquet et al. ............... 280/777 |
| 6,039,350 A | * | 3/2000 | Patzelt et al. ................. 280/775 |
| 6,659,504 B2 | * | 12/2003 | Riefe et al. ................... 280/777 |
| 6,862,947 B2 | * | 3/2005 | Cooper et al. ................. 74/493 |
| 6,981,430 B2 | * | 1/2006 | Murakami et al. ............. 74/493 |
| 7,204,516 B2 | | 4/2007 | Schneider et al. |
| 7,384,070 B2 | * | 6/2008 | Sato et al. .................... 280/777 |
| 7,445,241 B2 | * | 11/2008 | Higashino .................... 280/777 |
| 7,506,893 B2 | * | 3/2009 | Higashino et al. ............. 280/776 |
| 2002/0033593 A1 | * | 3/2002 | Hancock et al. ............... 280/777 |
| 2005/0052014 A1 | * | 3/2005 | Lee ............................. 280/777 |
| 2005/0173914 A1 | * | 8/2005 | Sadakata et al. .............. 280/777 |
| 2008/0196536 A1 | * | 8/2008 | Manwaring et al. ............ 74/493 |

FOREIGN PATENT DOCUMENTS

GB 2260953 A * 5/1993

* cited by examiner

*Primary Examiner*—Faye M. Fleming
(74) *Attorney, Agent, or Firm*—Cantor Colburn LLP

(57) ABSTRACT

A steering column assembly includes a column jacket adjustable along a longitudinal axis and collapsible along the longitudinal axis in response to a collision event. A compression bracket is mounted to the column jacket and defines a telescope slot having an adjustment portion and a continuation portion. A shaft extends through the telescope slot with the column jacket and the compression bracket moveable relative to the shaft during adjustment and collapse of the steering column assembly. A stop is detachably coupled to the compression bracket and partially covers the telescope slot to prevent movement of the shaft into the continuation portion during adjustment. The stop detaches during collapse to permit the shaft into the continuation portion. A lever rotates with the shaft and includes a tab for engaging the stop when the lever is in an unlocked position to prevent detachment of the stop during adjustment.

20 Claims, 5 Drawing Sheets

TELESCOPICALLY ADJUSTABLE STEERING COLUMN ASSEMBLY INCLUDING AN ADJUSTMENT STOP HAVING MINIMAL EFFECT ON IMPACT LOADS

CROSS REFERENCE TO RELATED APPLICATION

This application claims the benefit of U.S. Provisional Patent Application Ser. No. 61/016,875 filed on Dec. 27, 2007, the disclosure of which is hereby incorporated by reference.

BACKGROUND OF THE INVENTION

1. Field of the Invention

The subject invention relates to a steering column assembly, and more specifically a telescopically adjustable and collapsible steering column assembly.

2. Description of the Prior Art

Many telescopically adjustable steering column assemblies include a compression bracket coupled to a column jacket that is longitudinally moveable along a longitudinal axis. Typically, the compression bracket defines a telescope slot through which a rake bolt extends. The column jacket moves relative to the rake bolt along the longitudinal axis with the rake bolt moving within the telescope slot between a full-out position in which the column jacket is fully extended and a full-in position in which the column jacket is fully retracted. In the event of a collision, the steering column assembly is collapsible to absorb energy and reduce the likelihood of injury to a driver. In order to provide a sufficient collapse stroke, the telescope slot is often lengthened, e.g., includes a continuation portion beyond the full-in position. However, there is nothing to prevent movement of the rake bolt into the continuation portion when adjusting the position of the steering column assembly.

SUMMARY OF THE INVENTION AND ADVANTAGES

The subject invention provides a steering column assembly for a vehicle. The steering column assembly comprises a support bracket configured for attachment to the vehicle. A column jacket is coupled to the support bracket. The column jacket extends along a longitudinal axis and defines a telescope slot extending along the longitudinal axis. The telescope slot includes an adjustment portion and a continuation portion. The column jacket is adjustable along the longitudinal axis relative to the support bracket, and is collapsible along the longitudinal axis relative to the support bracket in response to a collision event. A shaft is coupled to the support bracket. The shaft extends through the telescope slot with the telescope slot moveable relative to the shaft during the adjustment and the collapse of the column jacket. A stop is detachably coupled to the column jacket. The stop at least partially blocks a portion of the telescope slot. The stop limits movement of the shaft to within the adjustment portion of the telescope slot during the adjustment of the column jacket. The stop detaches from the column jacket during the collapse of the column jacket to permit movement of the shaft into the continuation portion of the telescope slot.

Accordingly, the steering column assembly of the subject invention is adjustable within the limits of the adjustment portion of the telescopes slot with the stop preventing movement of the shaft into the continuation portion of the telescope slot when adjusting a position of the steering column assembly. The stop is dislodged by the shaft during collapse of the steering column assembly, and therefore does not interfere with the collapse function of the steering column assembly.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate corresponding parts throughout the several views, a steering column assembly is shown generally at 20. The steering column assembly 20 is for a vehicle and extends along a longitudinal axis 22. The steering column assembly 20 is adjustable in a telescope direction parallel the longitudinal axis 22, i.e., axially adjustable along the longitudinal axis 22.

Figure 1:
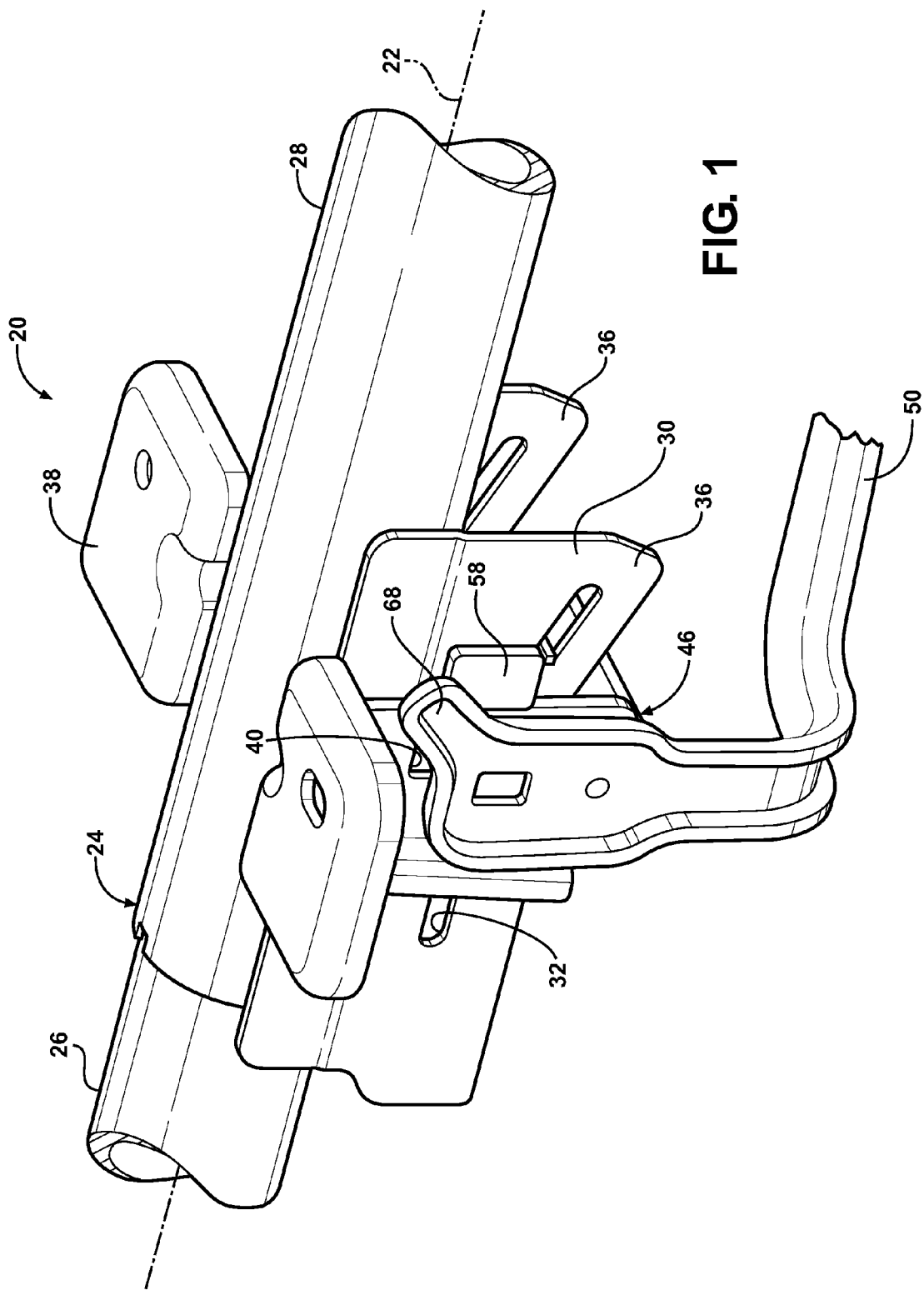
FIG. 1 is a perspective view of a steering column assembly.

Referring to FIG. 1, the steering column assembly 20 includes a column jacket 24. The column jacket 24 extends from a first end to a distal end along the longitudinal axis 22. A steering wheel (not shown) is mounted to the distal end of the column jacket 24 as is well known in the art. The column jacket 24 includes a lower jacket 26 in telescopic engagement with an upper jacket 28. During an emergency event, such as a vehicular crash, the lower jacket 26 collapses into the upper jacket 28 as is well known in the art. An energy absorbing device (not shown) is coupled to the steering column assembly 20 to absorb energy transmitted through the column jacket 24 during collapse of the column jacket 24. There are many known energy absorbing devices known in the art suitable for use with the steering column assembly 20 of the subject invention.

The column jacket 24 includes a compression bracket 30. The compression bracket 30 is fixedly mounted to the column jacket 24. The column jacket 24, and more specifically the compression bracket 30 of the column jacket 24, defines a telescope slot 32 parallel to and extending along the longitudinal axis 22. The compression bracket 30 includes a bottom wall 34 spaced from the column jacket 24 and a pair of side flanges 36 extending tangentially upward from the bottom wall 34 toward the column jacket 24 on opposing sides of the column jacket 24.

The steering column assembly 20 further comprises a support bracket 38 configured for attachment to the vehicle. The compression bracket 30, and thereby the column jacket 24, is coupled to the support bracket 38, with the support bracket 38 coupling the compression bracket 30 and the column jacket 24 to the vehicle. The column jacket 24 is adjustable along the longitudinal axis 22 relative to the support bracket 38 and is collapsible along the longitudinal axis 22 relative to the support bracket 38 in response to a collision event, such as a vehicular collision. The support bracket 38 defines a rake slot 40 transverse to the longitudinal axis 22. The rake slot 40 is generally perpendicular relative to the telescope slot 32. The support bracket 38 includes a pair of side plates 42 disposed on opposing sides of the column jacket 24 with each of the side plates 42 disposed adjacent one of the side flanges 36 of the compression bracket 30. Accordingly, the side plates 42 of the support bracket 38 are in overlapping parallel engagement with the pair of side flanges 36 of the compression bracket 30.

A shaft 44, commonly referred to as a rake bolt, is coupled to the support bracket 38. The shaft 44 extends transverse to the longitudinal axis 22 across the column jacket 24 through the rake slot 40 and the telescope slot 32. The telescope slot 32 is moveable relative to the shaft 44 during the adjustment and the collapse of the column jacket 24.

The steering column assembly 20 further includes a locking mechanism 46 coupled to the shaft 44. The locking mechanism 46 secures the longitudinal position of the column jacket 24 relative to the support bracket 38 when the shaft 44 is in a locked position. The locking mechanism 46 permits adjustment of the column jacket 24 relative to the support bracket 38 when the shaft 44 is in an unlocked position. The shaft 44 is rotatable about a central axis 48 to actuate the locking mechanism 46.

Figure 3:
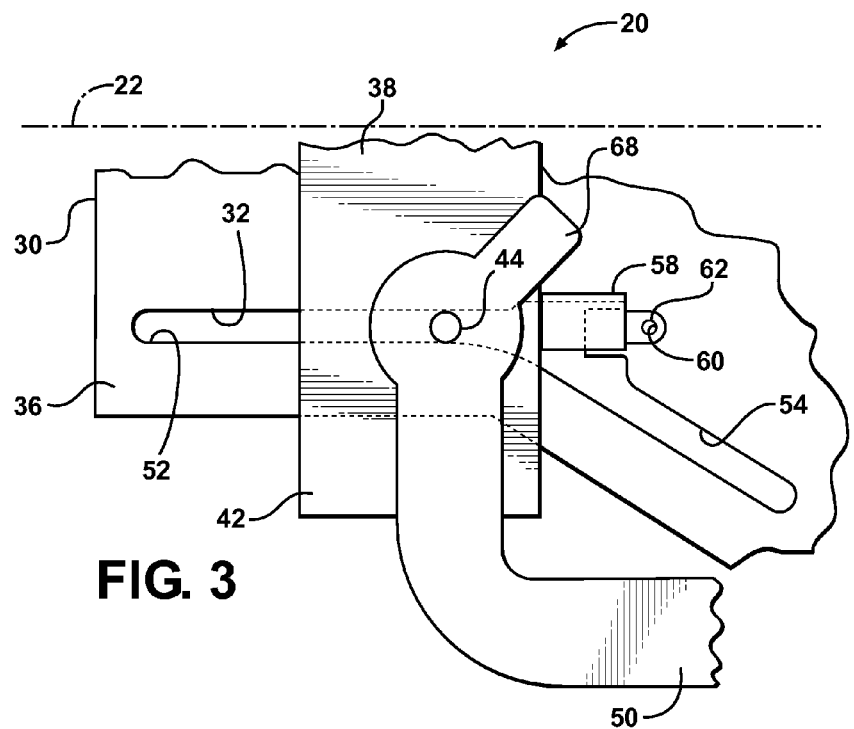
FIG. 3 is a fragmentary side plan view of the steering column assembly in a locked position.
Figure 5:
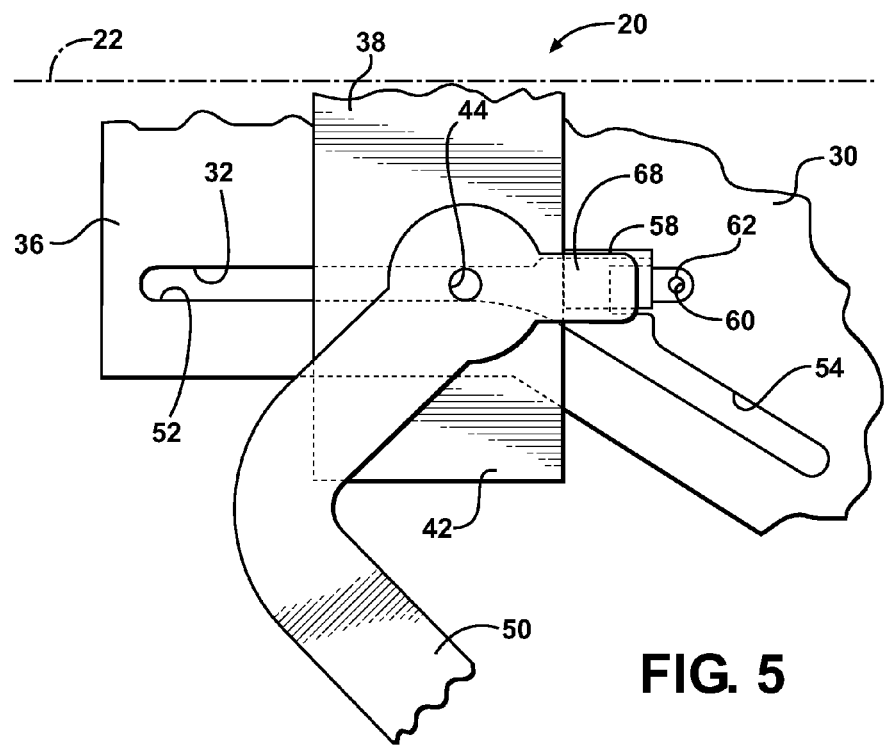
FIG. 5 is a fragmentary side plan view of the steering column assembly in an unlocked position.

A lever 50 is coupled to the shaft 44 for rotating the shaft 44 about the central axis 48 between the locked position, shown in FIGS. 1 and 3, and the unlocked position, shown in FIG. 5. Accordingly, rotating the lever 50 into the unlocked position releases the locking mechanism 46 and permits longitudinal adjustment of the steering column assembly 20 and rotating the lever 50 into the locked position engages the locking mechanism 46 and secures the longitudinal position of the steering column assembly 20.

Figure 2:
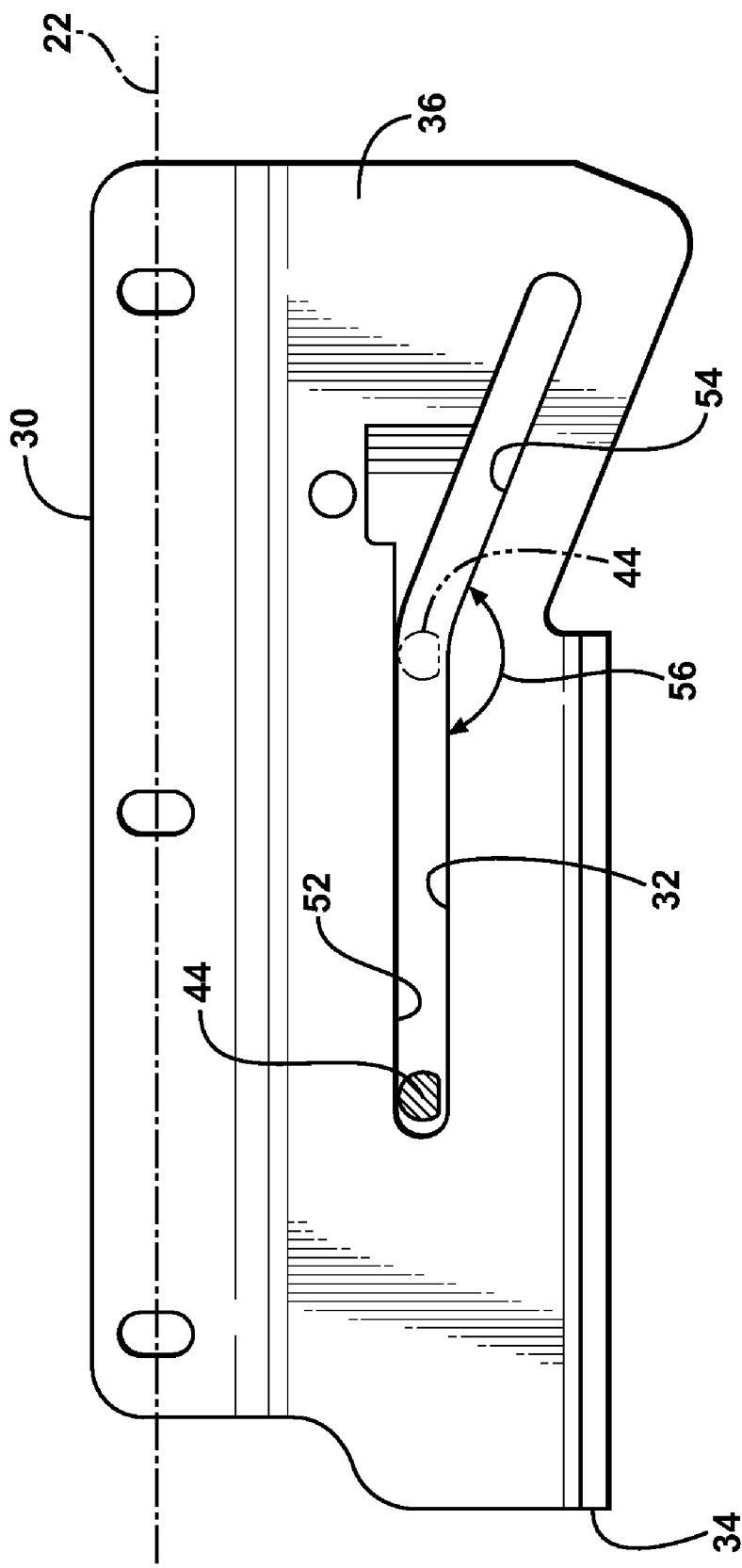
FIG. 2 is a side plan view of a compression bracket of the steering column assembly.

Referring to FIGS. 2, 3 and 5, the telescope slot 32 includes an adjustment portion 52 and a continuation portion 54. The adjustment portion 52 delimits the range of travel for telescopically adjusting the steering column assembly 20. The continuation portion 54 permits additional longitudinal movement of the column jacket 24 and the compression bracket 30 relative to the support bracket 38 and the shaft 44 during collapse of the steering column assembly 20. The adjustment portion 52 and the continuation portion 54 of the telescope slot 32 intersect and form an angle 56 therebetween, i.e., the continuation portion 54 is slightly angled relative to the adjustment portion 52. However, it should be appreciated that the adjustment portion 52 and the continuation portion 54 may extend along a collinear path. As shown in FIG. 2, it should also be appreciated that the position of the shaft 44 within the adjustment portion 52 of the telescope slot 32 changes between a full-out position, i.e., the steering column assembly 20 is fully extended, and a full-in position, i.e., the steering column assembly 20 is fully retracted, as the column jacket 24 is adjusted along the longitudinal axis 22.

Referring to FIG. 3 through, a stop 58 is detachably coupled to the column jacket 24. Specifically, the stop 58 is detachable coupled to one of the side flanges 36 of the compression bracket 30. The stop 58 at least partially blocks a portion of the telescope slot 32. The stop 58 limits movement of the shaft 44 to within the adjustment portion 52 of the telescope slot 32 during the adjustment of the column jacket 24. The stop 58 is detachable from the column jacket 24 during the collapse of the column jacket 24 to permit movement of the shaft 44 into the continuation portion 54 of the telescope slot 32. The stop 58 is disposed at the intersection of the continuation portion 54 and the adjustment portion 52 of the telescope slot 32. Accordingly, the stop 58 partially blocks free movement of the shaft 44 between the adjustment portion 52 and the continuation portion 54 of the telescope slot 32.

The column jacket 24 defines an aperture 60. More specifically, one of the side flanges 36 of the compression bracket 30 defines the aperture 60. The stop 58 includes a detent 62. The detent 62 of the stop 58 extends through the aperture 60 in a snap fit connection with the column jacket 24. Accordingly, the snap fit connection between the detent 62 and the aperture 60 detachably couples the stop 58 to the column jacket 24, i.e., the side flange 36 of the compression bracket 30. It should be appreciated that the stop 58 may be detachably coupled to the flange 36 in some other fashion not shown or described herein.

Figure 4:
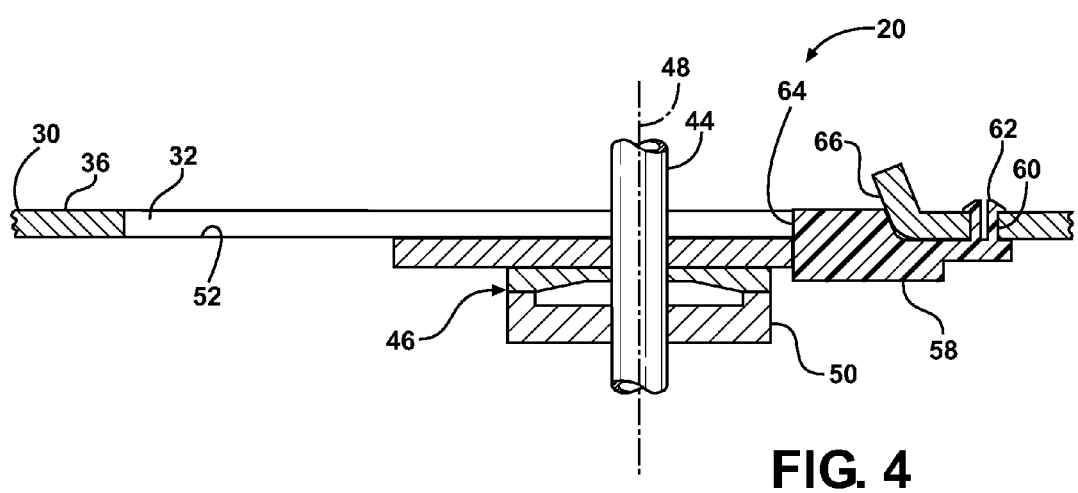
FIG. 4 is a fragmentary cross sectional view of the steering column assembly in the locked position shown in FIG. 3.
Figure 6:
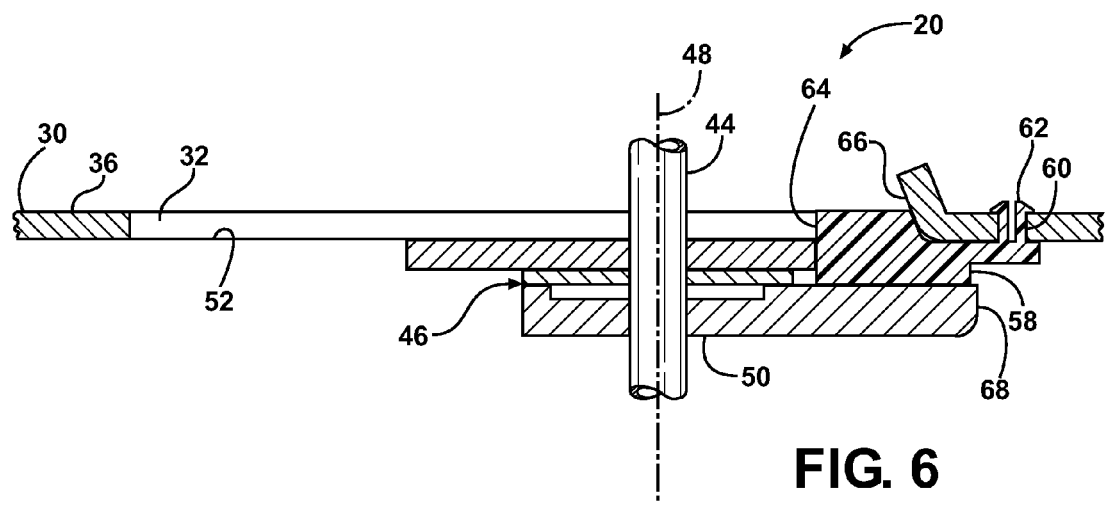
FIG. 6 is a fragmentary cross sectional view of the steering column assembly in the unlocked position shown in FIG. 5.

As shown in FIGS. 4 and 6, the stop 58 is attached to a side of the flange 36, and includes a lip portion 64 extending inward into the telescope slot 32. The column jacket 24, and more specifically the side flange 36 of the compression bracket 30, includes an angled ledge 66 partially defining the telescope slot 32. The angled ledge 66 is disposed at an end of the adjustment portion 52 of the telescope slot 32, adjacent the continuation portion 54 of the telescope slot 32. The lip portion 64 of the stop 58 rests, i.e., abuts, against the angled ledge 66. The angled ledge 66 is disposed at an approximate forty five degree (45°) angle 56 relative to the longitudinal axis 22 and the side flange 36 of the compression bracket 30, and is directed inward toward the longitudinal axis 22 and the column jacket 24 in the direction the upper jacket 28 moves during collapse of the column jacket 24.

Referring to FIGS. 3 through 6, a stop 58 is detachably coupled to the column jacket 24. Specifically, the stop 58 is detachable coupled to one of the side flanges 36 of the compression bracket 30. The stop 58 at least partially blocks a portion of the telescope slot 32. The stop 58 limits movement of the shaft 44 to within the adjustment portion 52 of the telescope slot 32 during the adjustment of the column jacket 24. The stop 58 is detachable from the column jacket 24 during the collapse of the column jacket 24 to permit movement of the shaft 44 into the continuation portion 54 of the telescope slot 32. The stop 58 is disposed at the intersection of the continuation portion 54 and the adjustment portion 52 of the telescope slot 32. Accordingly, the stop 58 partially blocks free movement of the shaft 44 between the adjustment portion 52 and the continuation portion 54 of the telescope slot 32.

Figure 7:
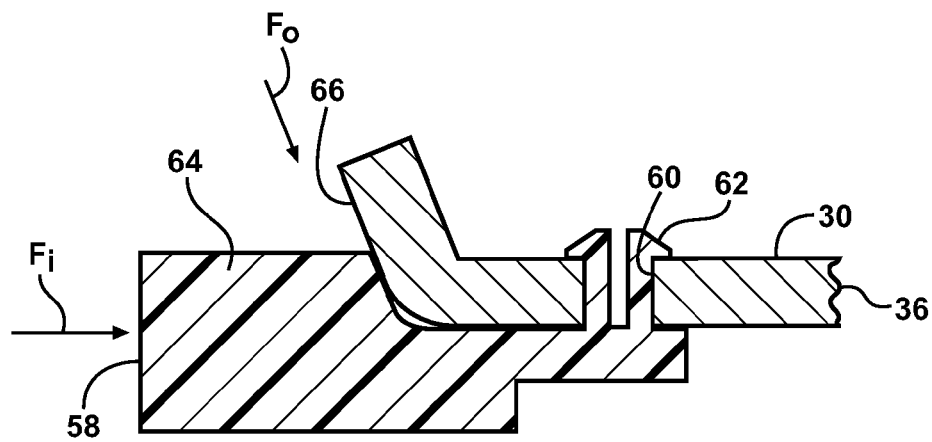
FIG. 7 is a force diagram of the steering column assembly in the locked position.
Figure 8:
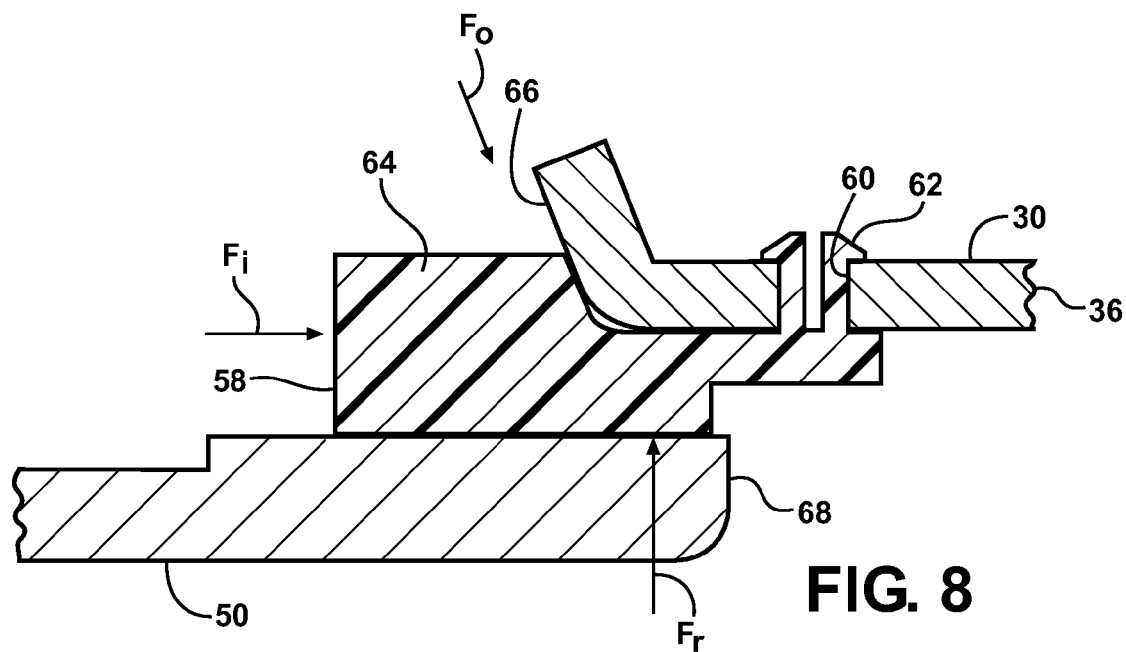
FIG. 8 is a force diagram of the steering column assembly in the unlocked position.

During normal operation of the steering column assembly 20, the lever 50 is in the locked position with the tab 68 disengaged from the stop 58. The locking mechanism 46 thereby prevents longitudinal adjustment of the steering column assembly 20. In the event of a collision event, the upper jacket 28 and the compression bracket 30 collapse along the longitudinal axis 22. As a result, the relative position of the shaft 44 within the telescope slot 32 changes, with the stop 58 moving toward the shaft 44. Referring to FIG. 7, upon the stop 58 contacting the shaft 44, the shaft 44 exerts an axial impact force $F_i$ directed along the longitudinal axis 22. The angled ledge 66 of the telescope slot 32 resists the impact force $F_i$. However, because the ledge is angled to direct the stop 58 outward away from the flange 36, a resultant outward force $F_o$ is created. When the axial impact force $F_i$ is of sufficient magnitude to generate the resultant outward force $F_o$ greater than a pre-determined level, the resultant outward force $F_o$ dislodges the detent 62 from the aperture 60, thereby allowing the shaft 44 to pass into the continuation portion 54 of the telescope slot 32 during collapse of the steering column assembly 20.

As shown in FIGS. 4 and 6, the stop 58 is attached to a side of the flange 36, and includes a lip portion 64 extending inward into the telescope slot 32. The column jacket 24, and more specifically the side flange 36 of the compression bracket 30, includes an angled ledge 66 partially defining the telescope slot 32. The angled ledge 66 is disposed at an end of the adjustment portion 52 of the telescope slot 32, adjacent the continuation portion 54 of the telescope slot 32. The lip portion 64 of the stop 58 rests, i.e., abuts, against the angled ledge 66. The angled ledge 66 is disposed at an approximate forty five degree (45°) angle relative to the longitudinal axis 22 and the side flange 36 of the compression bracket 30, and is directed inward toward the longitudinal axis 22 and the column jacket 24 in the direction the upper jacket 28 moves during collapse of the column jacket 24.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A steering column assembly for a vehicle, said assembly comprising:
    a support bracket configured for attachment to the vehicle;
    a column jacket coupled to said support bracket and extending along a longitudinal axis and defining a telescope slot extending along said longitudinal axis with said telescope slot including an adjustment portion and an continuation portion, and said column jacket being adjustable along said longitudinal axis relative to said support bracket and collapsible along said longitudinal axis relative to said support bracket in response to a collision event;
    a shaft coupled to said support bracket and extending through said telescope slot with said telescope slot moveable relative to said shaft during said adjustment and said collapse of said column jacket;
    a stop detachably coupled to said column jacket and at least partially blocking a portion of said telescope slot with said stop limiting movement of said shaft to within said adjustment portion of said telescope slot during said adjustment of said column jacket and said stop detachable from said column jacket during said collapse of said column jacket to permit movement of said shaft into said continuation portion of said telescope slot.

2. An assembly as set forth in claim 1 wherein said column jacket defines an aperture and said stop includes a detent extending through said aperture in a snap fit engagement with said column jacket.

3. An assembly as set forth in claim 2 wherein said column jacket includes an angled ledge partially defining said telescope slot.

4. An assembly as set forth in claim 3 wherein said stop includes a lip portion extending inward into said telescope slot and abutting said angled ledge with said stop detachable from said column jacket in response to said shaft applying an axial impact force $F_i$ to said stop along said longitudinal axis sufficient to generate a resultant outward force $F_o$ directed outward from said column jacket along said angled ledge above a pre-determined level to dislodge said detent from said aperture.

5. An assembly as set forth in claim 4 wherein said angled ledge extends at a forty five degree (45°) angle relative to said longitudinal axis.

6. An assembly as set forth in claim 4 further comprising a lever coupled to said shaft and rotatable with said shaft about a central axis between a locked position and an unlocked position.

7. An assembly as set forth in claim 6 wherein said lever includes a tab extending radially outward from said central axis and rotatable with said lever about said central axis with said tab engaging said stop when said lever is in said unlocked position to prevent detachment of said stop from said column jacket in response to said shaft impacting said stop during adjustment of said column jacket and said tab disengaged from said stop when said lever is in said locked position to permit detachment of said stop from said column jacket in response to said shaft impacting said stop during said collapse of said column jacket.

8. An assembly as set forth in claim 6 further comprising a locking mechanism coupled to said shaft for securing a position of said column jacket relative to said support bracket when said shaft is in said locked position and for permitting adjustment of said column jacket relative to said support bracket when said shaft is in said unlocked position.

9. An assembly as set forth in claim 1 wherein said adjustment portion of said telescope slot and said continuation portion of said telescope slot intersect and form an angle therebetween.

10. An assembly as set forth in claim 9 wherein said stop is disposed adjacent said intersection of said adjustment portion and said continuation portion of said telescope slot.

11. An assembly as set forth in claim 1 wherein said adjustment portion of said telescope slot and said continuation portion of said telescope slot extend along a collinear path.

12. An assembly as set forth in claim 4 wherein said column jacket includes a compression bracket with said compression bracket defining said telescope slot.

13. An assembly as set forth in claim 12 wherein said compression bracket includes a bottom wall and a pair of side flanges extending upward from said bottom wall toward said column jacket on opposing sides of said column jacket.

14. An assembly as set forth in claim 13 wherein at least one of said side flanges of said compression bracket defines said aperture and said stop is detachably coupled to said compression bracket.

15. An assembly as set forth in claim 13 wherein at least one of said side flanges of said compression bracket defines said angled ledge.

16. An assembly as set forth in claim 15 wherein said angled ledge extends from said side flange of said compression bracket at a forty five degree (45°) angle relative to said side flange.

17. An assembly as set forth in claim 13 wherein said support bracket includes a pair of side plates disposed on opposing sides of said column jacket with each of said side plates disposed adjacent one of said side flanges of said compression bracket.

18. An assembly as set forth in claim 17 wherein each of said side plates of said support bracket define a rake slot with said shaft extending through said rake slots.

19. An assembly as set forth in claim 4 wherein said column jacket includes an upper jacket and a lower jacket telescopically engaged with said upper jacket.

20. An assembly as set forth in claim 19 wherein said upper jacket moves relative to said lower jacket during said adjustment and said collapse of said column jacket.

* * * * *